June 17, 1969

R. E. SMITH

3,450,881

SAMPLE TRANSFERRING APPARATUS FOR RADIOACTIVE SAMPLES

Filed April 6, 1965

INVENTOR.
Roy E. Smith,
BY Wolfe, Hubbard, Voit & Osann
Attorneys.

June 17, 1969 R. E. SMITH 3,450,881
SAMPLE TRANSFERRING APPARATUS FOR RADIOACTIVE SAMPLES
Filed April 6, 1965 Sheet 2 of 5

Fig. 3.

INVENTOR.
Roy E. Smith,
BY
Wolfe, Hubbard, Voit + Osann
Attorneys.

Fig. 5.

June 17, 1969  R. E. SMITH  3,450,881
SAMPLE TRANSFERRING APPARATUS FOR RADIOACTIVE SAMPLES
Filed April 6, 1965

INVENTOR.
Roy E. Smith,
BY Wolfe, Hubbard, Voit & Osann
Attorneys.

United States Patent Office 3,450,881
Patented June 17, 1969

3,450,881
SAMPLE TRANSFERRING APPARATUS FOR RADIOACTIVE SAMPLES
Roy E. Smith, Villa Park, Ill., assignor to Packard Instrument Company, Inc., Brookfield, Ill., a corporation of Illinois
Filed Apr. 6, 1965, Ser. No. 445,956
Int. Cl. H01j 1/52; G21h 5/00
U.S. Cl. 250—106
2 Claims

ABSTRACT OF THE DISCLOSURE

In an apparatus for detecting and measuring radioactivity emanating from a sample by scintillation techniques, a sample transferring mechanism is provided which permits a sample to be inserted into, or withdrawn from, the scintillation zone. The mechanism features a light lock with gates above and below a lock area so that the sample may be transferred via the lock area into the scintillation zone. The light lock is constructed to eliminate rubbing contact of the elevator or sample container which would produce static electricity and hence spurious scintillation signals. Gates surrounding the lock area are actuated by fluid operated interlocking controls.

---

The present invention relates in general to apparatus for detecting and measuring radioactivity emanating from a sample and, more particularly, to an improved transfer mechanism suitable for use with such detecting apparatus and adapted to introduce a sample into, and remove the sample from, a detection chamber. In its principal aspect, the invention is concerned with an improved elevator mechanism for lowering vials or the like containing a liquid scintillator and a radioactive isotope to be measured into a light detection chamber, and for subsequently ejecting the vial from the detection chamber upon completion of a counting cycle.

It is a general aim of the present invention to enhance the accuracy of output responses from such detecting apparatus by providing an improved shielding arrangement for excluding extraneous spectral radiation at all possible positions of the sample transport mechanism relative to the light detectors.

More specifically, it is an object of the invention to provide an improved sealing arrangement between the sample transport mechanism. And the detection equipment, such a sealing arrangement characterized by its ability to provide an effective light-tight seal, yet wherein the sealing arrangement will not generate static electricity which would produce spurious light responses that are detected by the associated light detecting equipment. While not so limited in its application, the invention will find especially advantageous use in conjunction with radioactivity detecting apparatus of the type employing a "light pipe" for maximizing the conversion of scintillation light flashes into signal information since such "light pipes" are commonly made of light transmissive plastic material which tends to produce a relatively high number of spurious counts in the detecting equipment when subjected to rubbing contact with portions of the vial or transport mechanism. Not only do plastic "light pipes" tend to produce a relatively great number of spurious signals when subject to rubbing contact, but moreover the "light pipes" also tend to produce such spurious signals for a longer period of time after being subjected to rubbing contact than do other substances.

An apparatus has heretofore been proposed, in co-pending application Ser. No. 273,110, filed Apr. 15, 1963, by Robert E. Olson and issused Aug. 3, 1965 as U.S. Patent No. 3,198,948 which provides an improved sealing arrangement between the elevator and elevator shaft in radioactivity measuring apparatus characterized by the fact that the sealing means employed does not rub against, or contact, the elevator shaft during passage of the elevator therethrough. As a consequence of attaining this objective, the inherent tendency to produce spurious light responses which are detected by photomultipliers or the like incident to rubbing contact between sealing material and the walls of the elevator shaft is effectively eliminated.

An object of the present invention is to provide a further improved sample handling device for use with radioactivity scintillation detecting apparatus, such device characterized by its extreme simplicity of construction and operation, yet which has the ability to afford positive sealing and extraneous light exclusion during sample transfer.

An additional object of the invention is to provide an improved, quietly operating, and reliable elevator mechanism and light-tight sealing arrangement therefore which has a minimum of moving parts, and has few components requiring close manufacturing tolerances or detailed assembly operations. Still another object is to provide a foolproof and fail-safe sample transfer mechanism.

In another of its important aspects, it is an object of the invention to provide an improved sample transfer mechanism which is characterized by its versatility and which can be used with substantially equal facility with virtually all of the automatic sample changers which are now available on the market.

A related object is to provide an improved sample transfer mechanism which can also be used in semi-automatic operations, for example, to automatically insert into, and eject from, a detection chamber, sample vials which are manually placed in a receiver on top of the detection apparatus.

It is a further object of the invention to provide an improved radiation detection apparatus which it not only characterized by its continuous light-tight integrity, but which achieves this desirable characteristic effectively with the use of a "straight-line" elevator shaft, thus making the apparatus easy to load and unload. In this connection it is an object to provide a radiation detection apparatus which provides a positive and reliable light-tight seal in operation, but which is nevertheless simple in construction, thus avoiding the relatively complex feeding mechanisms which have been used in the past to cope with the problems of spurious responses created by extraneous light sources.

It is still another object of the present invention to provide an improved automatic sample transfer mechanism which may readily be converted from automatic to manual or semi-automatic operation.

Other objects and advantages of the invention will become apparent as the following description proceeds, taken in conjunction with the accompanying drawings, in which.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

Figure 1:
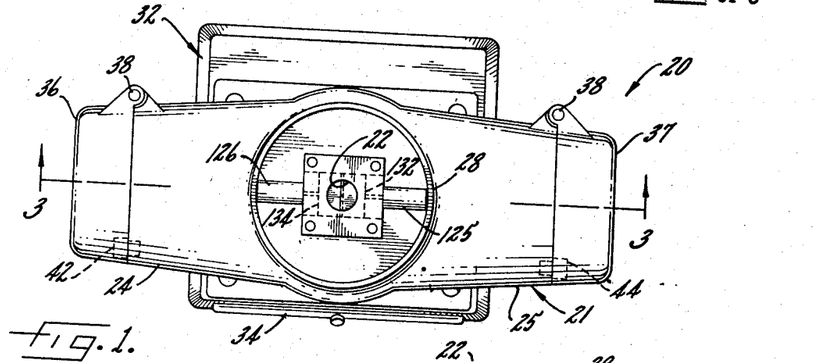
FIGURE 1 is a plan view of an exemplary sample transfer mechanism embodying the features of the present invention, here illustrating the mechanism with its shutter in the closed position.

Referring now to the drawings, there is illustrated in FIG. 1 an exemplary radiation detecting and measuring apparatus, generally indicated at 20, which is suitable for measuring the radioactive energy levels of test samples in accordance with the features of the present invention. As the ensuing description proceeds, it will become apparent that the present invention will find particularly advantageous use with radiation detecting equipment of the type used in detecting and measuring the activity or energy level of a test sample wherein a radioactive source is disposed within a solution containing a liquid scintillator, the latter having the characteristic property of producing light flashes when subjected to ionizing radiation. Such detectors are commonly referred to as "liquid scintillation detectors." The present apparatus 20 is primarily intended to receive and process sample vials containing such a liquid scintillator and radioactive source.

Figure 2:
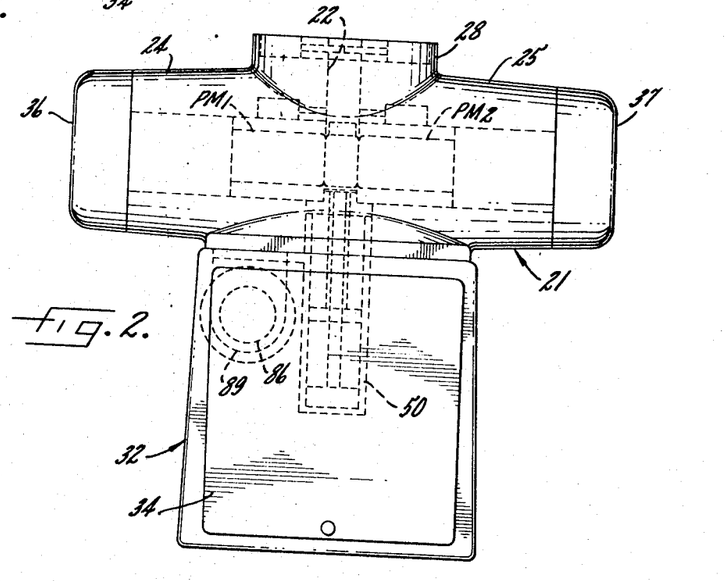
FIG. 2 is a front elevational view of the apparatus shown in FIG. 1.
Figure 3:
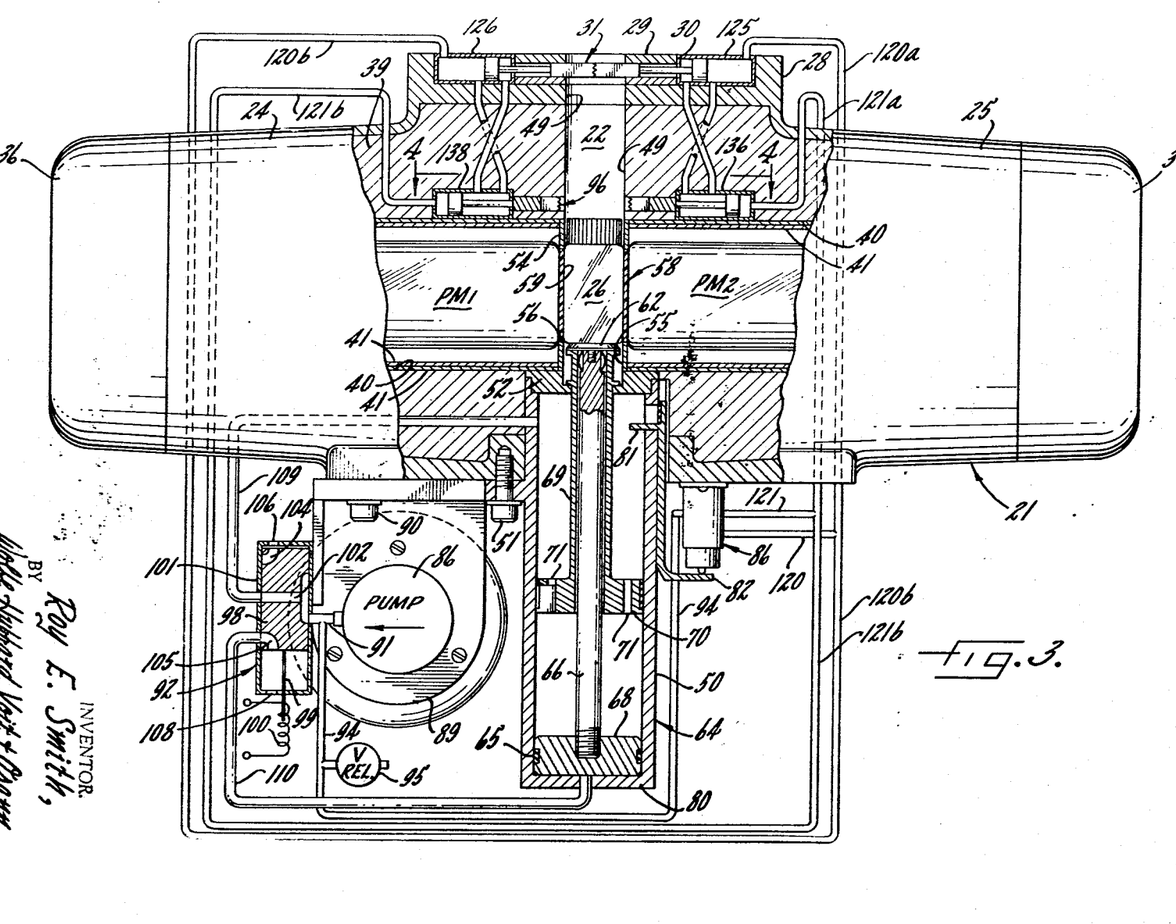
FIG. 3 is an enlarged sectional view taken substantially along the line 3—3 of FIG. 1, here illustrating the transfer mechanism in the down or "sample loaded" position with the sample to be analyzed interposed between a pair of light transducers and with the top shutter closed and the bottom shutter open.

For this purpose, the apparatus 20 includes an outer housing, or shield and base assembly 21, which defines a vertically disposed detection well 22 adapted to receive sample vials one at a time in seriatim order. The shield and base assembly 21 is provided with a pair of laterally extending arms 24, 25 which serve to house proportional light transducers characterized by their ability to detect light scintillations in the sample vials and to convert such light scintillations into electrical signals, for example, voltage pulses which are proportional in amplitude to the light flash that causes the pulse. Such light transducers are well known in the art and need not be described in detail. As best shown in FIG. 3, the transducers may simply comprise a pair of photomultipliers PM1, PM2 which are mounted in oppositely disposed, coaxial, spaced relationship in the arms 24, 25 of the shield and base assembly 21. Thus, the photomultipliers are positioned on opposite sides of the detection well 22 so that sample vials 26 which are introduced into the well are mounted therebetween in light transmissive relationship therewith. The upper end of the shield and base assembly 21 comprises a generally cylindrical flange portion 28 having a planar upper surface 29 substantially coaxial with the detection well 22 and defining a rectangular recess 30 (FIG. 3) suitable for receiving a shutter mechanism generally indicated at 31 (FIG. 3). The lower end of the shield and base assembly includes a generally box shaped housing or stand 32 suitable for housing control component used in conjunction with the apparatus 20. As best shown in FIG. 2, the housing 32 may be provided with an access door 34 which permits of ease in both installation and servicing.

The general organization of the apparatus is such that the sample vial 26 may be lowered into the cylindrical detection well 22 during a "count" cycle to a position where the light scintillations occurring in the sample are detected and measured by the photomultipliers PM1, PM2. Since the latter are particularly sensitive to spectral radiation, provision must be made for insuring that they are maintained in a light-tight housing at all times, so that the only light to which they are subjected is the scintillations occurring in the sample 26. It is for this reason that the upper end of the detection well is closed by a shutter mechanism 31 at all times other than when a sample is being loaded into the detection well 22 or ejected out of the detection well. While the particular means employed for delivering successive sample vials 26 to the apparatus is not critical to the present invention, those skilled in the art will appreciate that numerous types of automatic sample changers or conveyors could be employed to bring successive samples (represented diagrammatically in FIG. 6 at 26a, 26b and 26c) to a point of registration with the upper end of the detection well 22. A typical completely automatic sample changer with which the present invention finds particularly advantageous use is disclosed in the copending application of Lyle E. Packard, Roy E. Smith, Alfred A. Munn and Edward F. Polic, Ser. No. 273,189, filed Apr. 16, 1963, and issued June 21, 1966 as U.S. Patent No. 3,257,561 and assigned to the assignee of the present invention. However, while it will be understood that the present invention can find use with a wide range of different types of automatic sample changers, it is by no means exclusively limited to use with such sample changers. Indeed, the present invention will also find use in the less expensive manual versions of detection apparatus wherein successive samples are delivered to a point of registration with the detection well by hand.

Referring more particularly to FIG. 3, the bases of the photomultipliers (not shown) PM1 and PM2 are received within a socket and are inserted into the arms 24, 25 from the outer extremities thereof. A typical socket is depicted in the copending application of Robert E. Olson, Ser. No. 273,110, filed Apr. 15, 1963, now U.S. Patent No. 3,198,948 and commonly assigned. To this end, the apparatus includes a pair of end caps 36, 37 which are hinged to the arms at 38 (FIG. 1) for pivotal movement about a vertical axis. The outer portion of the apparatus comprises a casing which may be made, for example, of aluminum and which is filled with suitable shielding material characterized by its ability to inhibit penetration of environmental background radiation. Such shielding material generally takes the form of lead and is here designated by the reference character 39. The lead shield defines a cylindrical transverse bore 40 into which the photomultipliers are coaxially inserted. Additional graded shielding means, generally indicated at 41, may be inserted into the bores 40 in surrounding relationship to the photomultipliers, although it will be understood that such additional shielding means is not critical to the present invention. For securing the end caps 36, 37 in place, suitable magnets generally indicated at 42 and 44 (FIG. 1) are mounted in the housing at a point generally diametrically opposite to the pivoted hinged connection. Thus, when it is necessary to replace the photomultipliers, or when other servicing operations are required, it is merely necessary to pivot the end caps about their hinge pins so as to expose the ends of the sockets and the electrical connections to the photomultipliers.

The detection well 22 includes an upper cylindrical bore 49 formed in the housing and the lead shield of base assembly 21. An enlarged tubular sleeve 50, serving also as a pneumatic cylinder, extends upwardly into the housing and is secured in place by means of suitable threaded fasteners 51. The upper end of the tubular sleeve 50 is stepped, and serves to support a generally cylindrical collar 52, the latter having an upwardly extending generally rectangular flange 54 (obscured in FIG. 3 by light pipe 58). A vertical bore 55, having generally the same diameter as the bore 49, is formed in the collar 52 and flange 54, the bores 49 and 55 being disposed in coaxial relationship. The flange 54 is further provided with a transverse rectangular slot 56 which extends entirely therethrough and which defines at its opposite ends a pair of windows adapted to be positioned adjacent the light receptive ends of the photomultipliers PM1 and PM2.

Figures 7, 8:
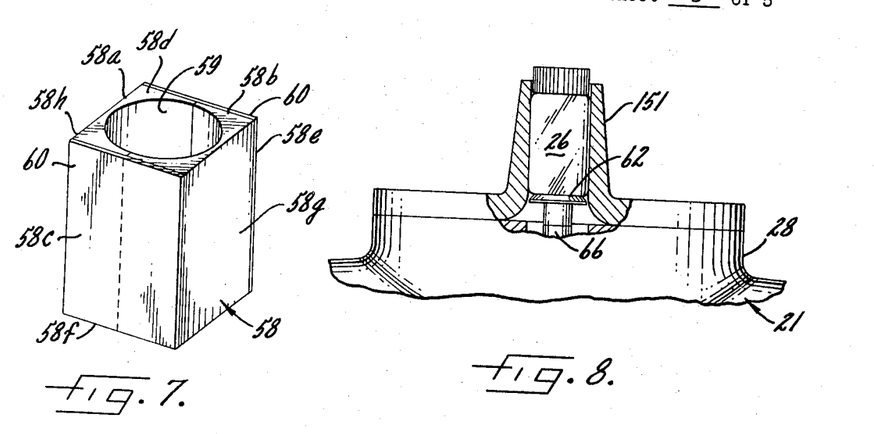
FIG. 7 is an enlarged perspective view of a typical "light pipe" used in conjunction with radiation detecting apparatus of the type shown in FIGS. 1 and 2.
FIG. 8 is a fragmentary sectional view similar to the upper portion of FIG. 3 and illustrating an exemplary vial positioning receiver which may be used with the apparatus shown in FIGS. 1 and 2 when the apparatus is being operated in semi-automatic or manual modes.

In order to maximize the conversion of light energy into electrical enregy, a light pipe 58 is positioned in the slot 56, the light pipe defining a cylindrical vertical bore 59 coaxial with, and having the same diameter as, the bores 49 and 55. As best illustrated in FIG. 7, the light pipe 58 comprises a pair of complementary mating blocks 58a, 58b of light transmissive thermoplastic material having complementary abutting faces shaped to define the bore 59. Thus, the block is generally cube-shaped having six outer walls 58c–58h. The oppositely disposed vertical walls 58g and 58h are coupled to the photomultipliers PM1 and PM2 respectively in light transmissive relationship therewith when the block is positioned in the slot 56. The remaining external walls 58c–58f are either painted or coated with a light reflective material 60 which serves to insure that all light scintillations occurring in the sample 26 are reflected towards the light sensitive elements in the photomultipliers PM1, PM2.

Figure 5:
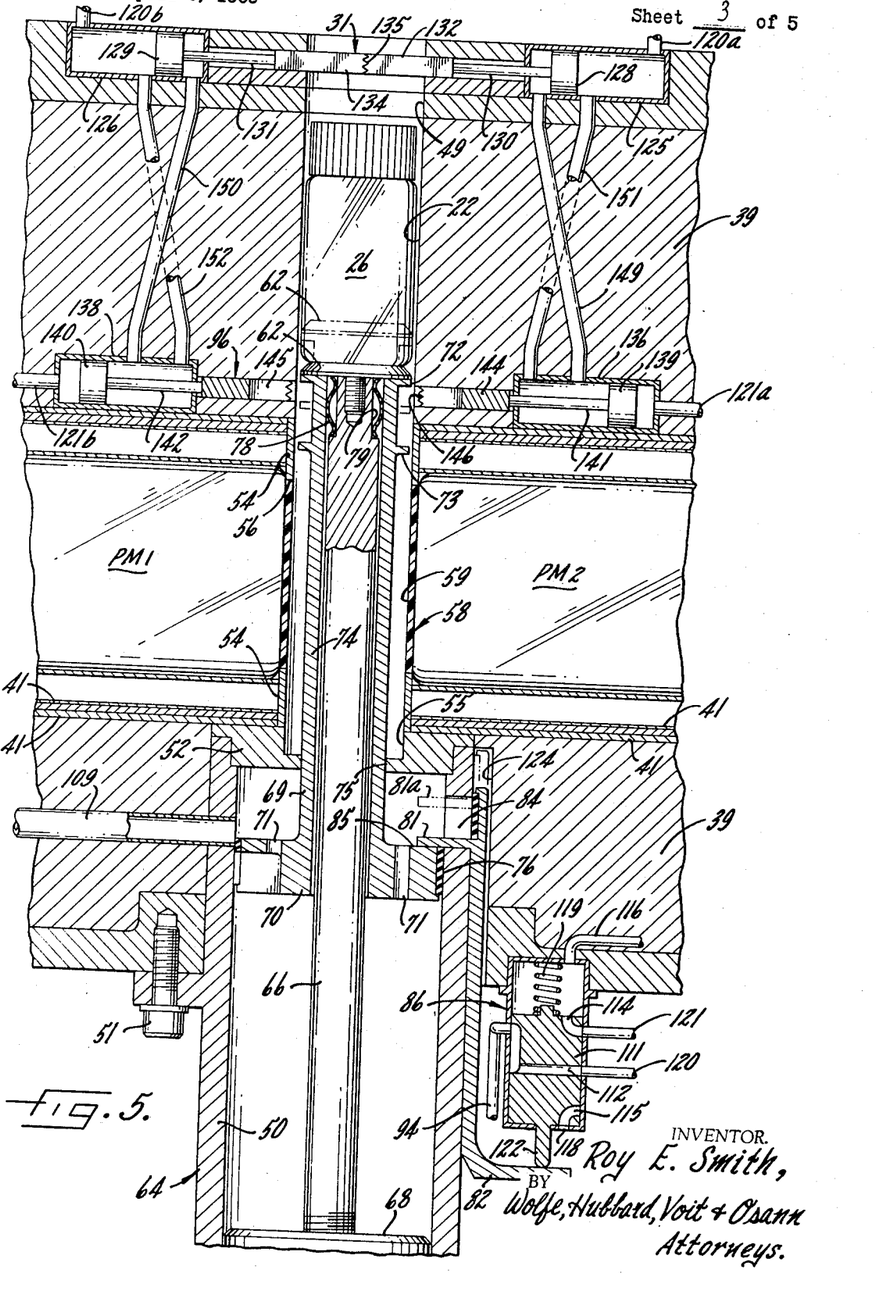
FIG. 5 is an enlarged, fragmentary, vertical section of a portion of the apparatus shown in FIG. 3 and illustrating details of the actuating mechanism for the light-tight sealing arrangement employed with the transfer mechanism, the apparatus here being shown during an intermediate portion of the upward elevator movement with the top shutter closed and the bottom shutter open.
Figure 6:
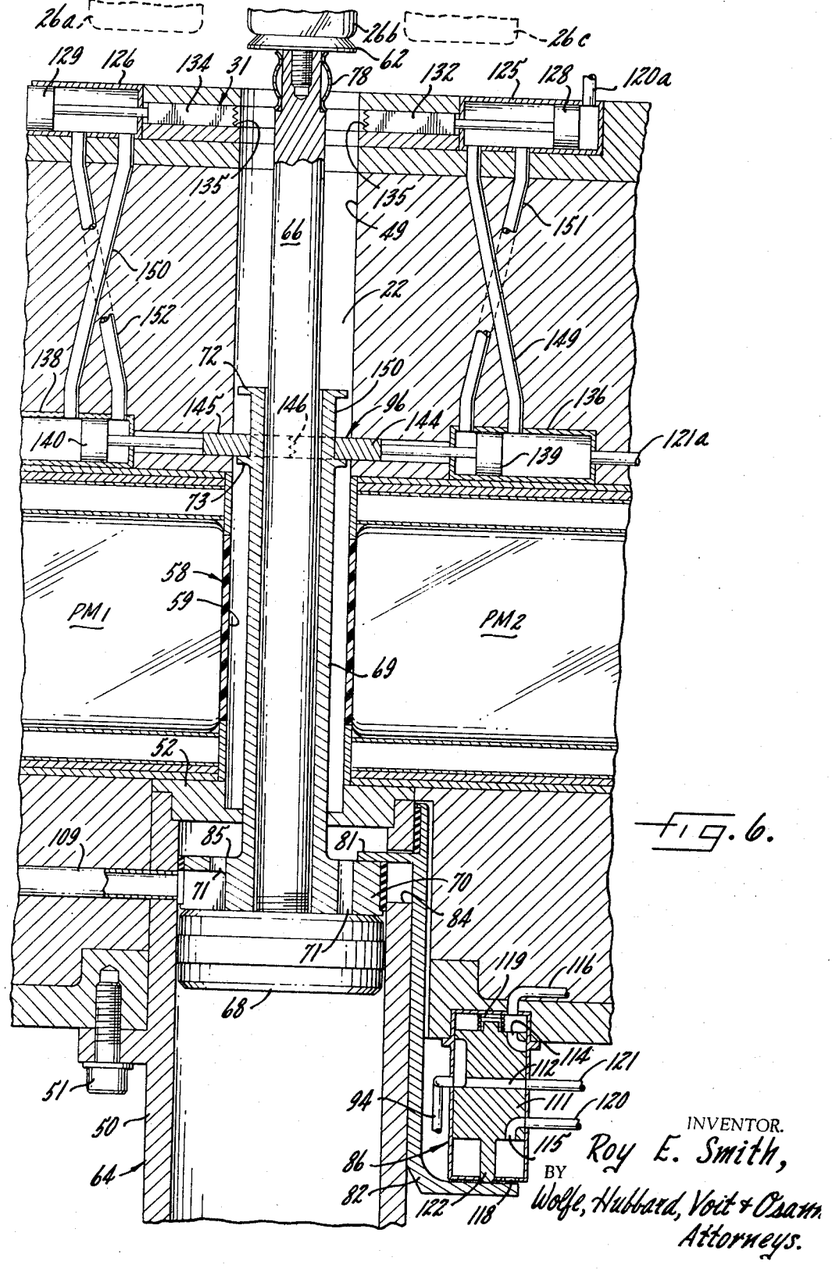
FIG. 6 is a view similar to FIG. 5 illustrating the transfer mechanism in the upper or "sample unloaded" position of the elevator, with the top shutter open and the bottom shutter closed.

As best illustrated in FIGS. 3, 5 and 6, when the foregoing components are assembled, the bores 49, 55 and 59 define a substantially continuous elevator shaft or well 22 which houses an elevator platform 62 adapted to support the sample vials 26 and to effect vertical reciprocation thereof into and out of the count chamber defined by the light pipe 58.

As noted before, a primary aim of the invention is to provide means for rendering the apparatus light-tight at all times and at all vertical positions of the elevator platform 62 in the apparatus, yet wherein there is no rubbing contact with the light pipe as the elevator mechanism passes therethrough. In accordance with an additional aspect of the invention, provision is also made for effecting vertical reciprocation of the elevator platform 62 within the elevator shaft or well 22 so as to selectively load and unload sample vials 26 into and out of the count chamber defined by light pipe 58. To this end, the elevator mechanism is movable within the elevator shaft or well 22 without touching the sides thereof, and the sample vials 26 are likewise smaller in diameter than any portion of elevator shaft or well 22 so that they also do not rub along the sides of well 22.

Referring to FIG. 3, it will be observed that the elevator mechanism includes a disc-shaped platform 62 on which sample vial 26 is carried through detection well 22. Platform 62 constitutes an integral portion of an axial elevator rod 66, which extends downward through tubular sleeve 50 and is of such length that, when extended vertically, platform 62 projects above the top level of flange portion 28. The bottom or lower end of elevator rod 66 is threadably attached to piston 68, which is maintained in fluid tight relationship against the inner walls of tubular sleeve 50 by a circumferential gasket or sealing ring 65.

Referring to FIGS. 3 and 5 conjointly, a sliding elevator sleeve 69 is disposed coaxially with elevator rod 66 and is provided at its lower portion with a collar 70 having a series of air transmitting ports 71 extending vertically through collar 70, and at its upper end with a pair of smaller collars 72 and 73. The shank portion 74 of sleeve 69 is vertically movable through bore 75 in cylindrical collar 52, white collar 70 is similarly movable vertically in tubular sleeve 50; if desired a friction-reducing lubricated bearing 76 may be provided in a circumferential channel in collar 70.

Elevator rod 66 and the elongated axial elevator sleeve 69 are maintained in frictionally sliding relationship when the two are at or below the position shown in phantom lines in FIG. 5 by providing a plurality of equidistantly spaced springs 78 recessed in key ways 79 milled into the top of elevator rod 66. Spring 78 therefore maintains sliding contact between rod 66 and sleeve 69 via the springs 78 whenever elevator rod 66 is ascending from the position shown in FIG. 3 to the phantom position shown in FIG. 5, and thus rod 66 and sleeve 69 are carried upward.

The bottom portion of tubular sleeve 50 is closed by an end plate 80 to define a pneumatic cylinder capable of actuating piston 68 and so elevate elevator rod 66 and sample vial 26.

Contact pin 81 connected to actuator rod 82 extends through vertical slot 84 and into tubular member 50, where it is engaged by upper surface 85 of collar 70 when the elevator sleeve 69 is in an upper position. In turn, actuator rod 82 is connected to four-way valve 86, the function of which will be described presently. Four-way valve 86 is shown in cross sectional detail in FIGURE 5.

A motor driven air compressing pump 86, shown in FIG. 3, is bolted to shield and base assembly 21 via bracket 89 and mounting bolts 90; the entire assembly of pump 86 and its associated mounting means are located within housing or stand 32 and are accessible through access door 34 (FIG. 2).

The discharge conduit 91 of pump 86 communicates to solenoid operated four-way valve 92 and to a conduit 94 provided with relief valve 95 to prevent the development of excessive pressures in discharge conduit 91.

As may be seen from FIG. 3, detection well 22 is essentially divided into upper and lower portions, defined respectively by bore 49 in lead shielding 39, and by the cylindrical vertical bore 59 in light communication with photomultiplier tubes PM1 and PM2. Dividing the two portions is a fluid operated (advantageously a pneumatically operated) lower shutter mechanism 96, while at the top of detection well 22 is the upper shutter mechanism 31. The operation of upper shutter mechanism 31 is best shown in FIG. 5, and that of lower shutter mechanism 96 in FIG. 6; description of both will be deferred momentarily.

Returning to pump 86 and four-way valve 92, the valve comprises a rectangular prismatic piston 98 coupled to armature 99 of solenoid 100. Piston 98 slides within valve body 101, and is provided with a distribution conduit 102 and with a pair of exhaust conduits 104 and 105. Conduits 104 and 105 discharge respectively through exhaust ports 106 and 108 in valve body 101.

In its uppermost position, as shown in FIG. 3, piston 98 transmits compressed air from pump discharge conduit 91 through distribution conduit 102 and thence to conduit 109 leading to the upper portion of tubular sleeve 50 (via ports 71), and will therefore lower piston 68 and its associated elevator rod 66 and platform 62. At the same time, any air entrapped beneath piston 68 will be exhausted through conduit 110, exhaust conduit 105, and exhaust port 108.

With solenoid 100 energized and piston 98 in its lowered position in four-way valve 92, compressed air from pump 86 and discharge conduit 91 passes through distribution conduit 102 into conduit 110, where it elevates piston 68 and the associated elevator rod 66 and platform 62, while air in the space above piston 68 is vented through conduit 109, exhaust conduit 104, and exhaust conduit 106. In summary, with four-way valve piston 98 in its upper position as shown in FIG. 3 the sample elevator mechanism will be urged to its lowermost or retracted position, while with piston 98 in its bottom position the elevating mechanism will be urged upwardly to its extended position.

Conduit 94 leading from discharge conduit 91 communicates with four-way valve 86, the details of which are shown in FIG. 5. A rectangular prismatic piston 111 is provided with a distribution conduit 112 and with a pair of exhaust conduits 114 and 115, which vent respectively through exhaust ports 116 and 118 in the body of four-way valve 86. An axially located spring 119 at the top of piston 111 urges the piston to a downward position so that, unless and until elevated, air from conduit 94 is transmitted to conduit 120, while any compressed air in conduit 121 is vented to the atmosphere through exhaust port 116.

The piston 111 in four-way valve 86 is moved to an elevated position when finger 122 is moved upward by the action of actuator rod 82 in response to an upward movement of collar 70 on elevator sleeve 69, which in turn is caused by an upward movement of the elevator piston 68. As shown in FIG. 5, contact pin 81 on actuator rod 82 engages the upper surface 85 of elevator sleeve 69 when sleeve 69 is moving upward, and as the sleeve continues its upward movement contact pin 81 is moved to position to 81a; correspondingly, the piston 111 in four-way valve 86 is moved from the position shown in FIG. 5 to an upper position in which it transmits compressed air from conduit 94 to conduit 121, permitting the pressure in conduit 120 to be vented through exhaust conduit 115. Upon lowering sleeve 69, contact pin 81 is returned to the position shown in solid lines in FIG. 5 by the spring action of spring 119, which returns compressed air flow to conduit 120. Air leakage past actuator rod 82 is restricted or prevented by suitable packing gland means, not shown, to seal slot 124 through which actuator rod 82 reciprocates.

Returning to FIG. 3, conduits 120 and 121 communicate respectively via conduits 120a, 120b, and 121a, 121b, to a series of pneumatic activators for upper shutter mechanism 31 and for lower shutter mechanism 96.

As shown in FIGS. 3, 5 and 6, compressed air conduits 120a and 120b respectively enter the rearward portions of pneumatic piston-driven shutter mechanism 31 at or near the rearward ends of pneumatic cylinders 125 and 126. These respective cylinders are provided with movable pistons 128 and 129 connected by shafts 130 and 131 to a pair of shutter blades 132 and 134. Shutter blades 132 and 134 are provided with serrated mating edges 135 to provide a light-tight sealing relationship when pistons 128 and 129 are in a forward or closed position, thus preventing any light from entering detection well 22. It is desirable when employing such serrated edges 135 that pistons 128 and 129 be provided with axial spring means (not shown) to maintain the pistons, and hence shutter blades 132 and 134, in a closed "fail-safe" position, thereby preventing any light from entering detection well 22 in the event air pressure is disrupted. Similar springs may be provided for pistons 139, 140.

Figure 9:
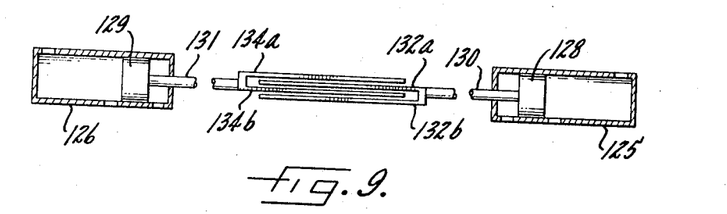
FIG. 9 is a side view of an alternative top shutter construction for use with the apparatus of FIGS. 1 and 2.

As an alternative to the use of springs to provide fail-safe operation of the upper shutter mechanism 31, the structure of FIG. 9 may be employed, where one, and preferably both, of shutter blades 132 and 134 is bifurcated and so constitutes two blades, 132a, 132b and 134a, 134b. The blades thus are interleaved, and will absolutely prevent access of light into detection well 22 irrespective of pneumatic air pressure termination.

A similar pair of pneumatically operated shutters constitute the lower shutter mechanism 96. Mechanism 96 comprises pneumatic cylinders 136 and 138, in which are positioned pistons 139 and 140 connected via piston rods 141 and 142 to shutter blades 144 and 145, respectively. Shutter blades 144 and 145 maintain a light-tight relationship with the sample vial elevator mechanism by engaging elevator sleeve 69 in the region between collars 72 and 73.

Figure 4:
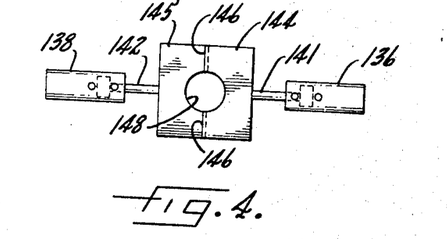
FIG. 4 is an enlarged view of the bottom shutter of FIG. 3.

As shown in FIG. 4, shutter blades 144 and 145 mate at edge 146, which is provided with circular recess 148 to engage with, and seal or close off, the elevator mechanism when the shutter blades 144, 145 are closed. Edge 146 and the edge of circular recess 148 are advantageously provided with a means to assure absolute light-tight relationship such as, for example, serrations of edge 146 as shown in FIG. 6, or by providing the respective edges with a deformable material such as a soft rubber or a felted textile surface.

Pistons 139 and 140 of pneumatic cylinders 136 and 138 may desirably be provided with axial springs, not shown in the drawings for clarity, to maintain the respective pistons in a normally closed position. This, as in the case of the corresponding pneumatic cylinders 126 and 128 of upper shutter mechanism 31, is designed to provide fail-safe operation of the elevator light-sealing system in the event of compressed air termination or disruption.

Upper shutter mechanism 31 and lower shutter mechanism 96 are coupled together via a series of air coupling conduits so that at least one of the shutters is in closed, light-tight, relationship with respect to detection well 22 at all times during the sample transfer cycle. In the embodiment shown in FIGS. 3, 5 and 6, coupling is provided by a pair of conduits 149, 150 extending from the forward portions of pneumatic cylinders 125 and 126 to intermediate positions in pneumatic cylinders 136 and 138, respectively. These intermediate positions are just behind the respective pistons 139 and 140 when they are in their forwardmost or closed position, as shown best in FIG. 6. Similarly, a pair of air coupling conduits 151, 152 communicates between the forwardmost portions of pneumatic cylinders 136, 138 and intermediate portions of cylinders 125, 126. As best shown in FIG. 5, conduits 150, 151 are so positioned in cylinders 126, 125, that they are uncovered when pistons 129, 128 are in their closed or forwardmost positions.

A complete sample transferring and radiation detecting cycle will now be described, and the course of operation of the elevator mechanism and the shutter or light sealing mechanisms explained. In the first position, shown in FIG. 6, the elevator mechanism represented by elevator rod 66, elevator sleeve 69, elevator platform 62, and piston 68 are in their fully extended position terminating outside the shield and base assembly 21. Sample vial 26, one of a series 26a, 26b, 26c, etc., is automatically placed atop elevator platform 62 and centered in position.

When the elevator mechanism is fully extended as shown in FIG. 6, piston 98 of four-way valve 92 (FIG. 3) will be in its lowered position, having been moved there by actuation of solenoid 100 working against a spring bias, not shown. Air pressure is accordingly being delivered from pump 86 (FIG. 3) through conduit 110 to tubular sleeve 50 below elevator piston 68.

With the elevator mechanism in its extended position as shown in FIG. 6, elevator sleeve 69 will accordingly be in its uppermost or extended position, and consequently upper surface 85 of collar 70 will have raised contact pin 81 of actuator rod 82. This places piston 111 of four-way valve 86 in the position shown in FIG. 6, and accordingly compressed air is being furnished from pump 86 (FIG. 3) through conduit 121 and thence through conduits 121a and 121b into the rearward portions of pneumatic cylinders 136, 138, thereby closing the lower shutter mechanism 96.

It will be observed in FIG. 6 that collars 72 and 73 on elevator sleeve 69 are spaced apart such that shutter blades 144, 145 of lower shutter mechanism can engage the cylindrical shank 150 in a light-tight sliding relationship. Thus, shutter blades 144, 145 are enabled to close and thereby engage elevator sleeve 69 at any position when contact pin 81 is being actuated by collar 70 of elevator sleeve 69.

With pneumatic cylinders 136 and 138 actuated and with their associated pistons 139, 140 in forward or closed positions, compressed air from conduits 121a, 121b is transmitted via conduits 149, 150 to the forward portions of pneumatic cylinders 125, 126, thereby maintaining pistons 128, 129, respectively in their retracted positions, as shown in FIG. 6. Retraction of pistons 128, 129 correspondingly maintains shutter blades 132, 134 of the upper shutter mechanism 31 in an open position, thus enabling the elevator mechanism to lower a sample vial 26b into the upper portion of detector well 22, as defined by vertical bore 49.

Any compressed air remaining behind pistons 128, 129 is vented via conduits 120a, 120b, (FIG. 6), conduit 120 (FIG. 3) and port 118 (FIG. 5).

When solenoid 100 (FIG. 3) is deactuated, piston 98 of four-way valve 92 returns to the position shown in FIG. 3. This allows compressed air in elevator cylinder 64 below piston 68 to be vented through conduit 110, and simultaneously transmits compressed air through conduit 109 to the upper portion of elevator cylinder mechanism 64, as shown in FIG. 5. Air entering cylinder 64 is transmitted via air transmitting port 71 in sleeve 70 to the region above piston 68, causing the piston 68 to move in a downward direction.

While elevator rod 66 is moving in a downward direction from the position shown in FIG. 6 to that shown in FIG. 5, elevator sleeve 69 remains stationary, friction springs 78 not yet being in contact with sleeve 69. Sleeve 69 thus remains in the position shown in FIG. 6, with collar 73 in position adjacent shutter blades 144, 145 and collar 72 disposed a substantial distance above the shutter blades. It will be noted that the vertical spacing between collars 72 and 73 permits the assembly of rod 66 and sleeve 69 to move in unison from the phantom or dotted line position of FIG. 5 to the solid line position without affecting the light-tight engagement of lower shutter blades 144, 145 with elevator sleeve 69.

However as elevator rod 66 continues its descent, reaching the level shown by dotted lines in FIG. 5, a positive pressure is applied to collar 72 of elevator sleeve 69, thus forcing it from the dotted position shown in FIG. 5 to the solid lined position shown in FIG. 5. Correspondingly, collar 70 is lowered into the solid lined position of FIG. 5, permitting contact pin 81 to move from the dotted position, 81a, to the solid lined position and permitting spring 119 associated with four-way valve 86 to urge actuator rod 82 into the position shown in the figure. Piston 111 of four-way valve 86 is likewise moved downward, from the position shown in FIG. 6 to that shown in FIG. 5.

When piston 111 of four-way valve 86 was in the position shown in FIG. 6 the elevator mechanism was in the position shown in FIG. 5 with sample vial 26 in the upper portion of the container or assembly 21. At this stage upper shutter mechanism 31 was open while lower shutter mechanism 96 was closed, thereby maintaining light-tight integrity of the cylindrical vertical bore 59 which constitutes the scintillation counting zone.

When however piston 111 of four-way valve 86 is in the position shown in FIG. 5 air is switched from conduit 121 into conduit 120, permitting conduit 121 to act as a vent. Air thus travels into the region behind pistons 128, 129 in pneumatic cylinders 125, 126, forcing the pistons to close shutters 132, 134. As the pistons 128, 129 move into the position shown in FIG. 5 they uncover the ports leading to conduits 151, 152 and thence in front of pistons 139, 140 associated with the lower shutter mechanism 96. As a consequence, pistons 139, 140 are moved backward, thus retracting shutter blades 144, 145.

It is particularly significant that shutter blades 144, 145 of the lower shutter mechanism 96 can be opened only after shutter blades 130, 131 of upper shutter mechanism 31 have been completely closed. This of course is achieved by positioning the entrances to conduits 151, 152 in pneumatic cylinders 125, 126 in such way that they are uncovered only after pistons 128, 129, respectively have moved to their essentially fully closed or forwardmost positions.

When shutter blades 144, 145 have been retracted, collar 72 and elevator platform 62 are then permitted to descend to their lowermost positions, that is, the position shown in FIG. 3. Sample vial 26 is now positioned in vertical bore 59 of light pipe 58 which, as explained previously, permits light scintillations to pass to photomultiplier tubes PM1 and PM2 to accomplish radiation detection or measurement. Sample vial 26 is maintained in the measuring position within light pipe 58, that is, in the lower portion of sample detection well 22, until piston 98 of four-way valve 92 is moved out of the position shown in FIG. 3 by actuating solenoid 100.

When measurement or detection of radiation from sample vial 26 is complete, current is applied to solenoid 100 which lowers piston 98 in four-way valve 92, thus transferring compressed air from conduit 109 to conduit 110 and allowing air to vent from elevator mechanism 64 through conduit 109. The compressed air passing through conduit 110 thereupon elevates elevator piston 68 and its associated elevator rod 66, platform 62, and sample vial 26 from the position shown in FIG. 3 in the bottom or lower half of assembly 21, until it is moved into a transitory position as again shown in FIG. 5.

Adverting to FIG. 5, shutter blades 132, 134 of upper shutter mechanism 31 remain in a closed position, and shutter blades 144, 145 of the lower shutter mechanism 96 are still open. These respective positions are maintained until contact pin 81 is moved from the solid lined position of FIG. 5 to the dotted lined position 81a of FIG. 5 by the continued upward movement of elevator piston 68 and elevator sleeve collar 70.

After contact pin 81 is in position 81a (FIG. 5) piston 111 of four-way valve 86 is moved from the position shown in FIG. 5 to that shown in FIG. 6, and correspondingly compressed air is transferred from conduit 120 to conduit 121. Conduit 120 now begins functioning as a vent.

Application of compressed air to conduit 121 moves pistons 139, 140 in pneumatic cylinders 136, 139, respectively, forward so as to close shutter blades 144, 145, all as shown in FIG. 6. With pistons 139, 140 in their forwardmost position, the ports leading to conduits 149, 150, respectively are opened and compressed air is transferred through these conduits to penumatic cylinders 125, 126 associated with the upper shutter mechanism 31, causing upper shutter blades 132, 134 to open. Opening of these upper shutter blades 132, 134 clears the way for the continued upward movement of elevator rod 66, platform 72, and sample vial 26 to the fully extended position shown in FIG. 6. Sample vial 26 is now ready to be replaced by the next successive sample vial, and the cycle may be repeated by disengaging power from solenoid 100.

As in the coupling of upper shutter mechanism 31 to lower shutter mechanism 92 during the descending portion of the sample transferring cycle, the respective shutter mechanisms have been likewise coupled together during the ascending portion of the cycle. Only after pistons 139, 140 had fully moved lower shutter mechanisms 144, 145 into light sealing relationship with elevator sleeve 69 were the ports leading to conduits 149, 150 opened to permit opening of shutter blades 132, 134 of the upper shutter mechanism 31. This provides absolutely safe foolproof operation in that power can be applied from one set of pistons to the next only after the first set have completely moved into operative position.

As discussed earlier, a mechanism for automatically and successively feeding sample vials 26 to elevator platform 62 has been described in a copending specification assigned to the assignee of this specification, and accordingly forms no part of the present invention. Indeed, where a limited number of samples are to be handled it may be desirable to dispense with the automatic sample transferring feature and instead use a manual feeding assembly as shown in FIG. 8. This merely consists of an iron boss 151 protruding above shield and base assembly 21 a sufficient distance to position the sample readily by hand atop elevator platform 62. Sample transferring proceeds as described previously, with solenoid 100 being energized by a manual switch instead of by a switch associated with the timing mechanism of automatic sequential sample feeding device.

A further feature, not shown in the drawings, may be included to prevent inadvertent actuation of a set of shutters on one side of the elevator mechanism without corresponding actuation of the other set. This could occur in the event one of the pistons became stuck in its closed position. This feature comprises a mechanical linkwork connecting piston 139 with 140, and/or connecting piston 128 and 129 to require each set of pistons to move in unison; a suitable linkwork may comprise, for example, a pair of cranks connecting extensions of pistons 139, 140, or 128, 129, with a pair of intermeshed gears. Thus, if lower shutter pistons 139, 140 are interconnected and if upper mechanism 31 were initially closed and lower shutter mechanism 96 initially open, lower shutter pistons 139, 140 could not move except in unison, and accordingly could not actuate upper shutter pistons 128, 129 unless both lower shutter pistons 139, 140 were closed.

I claim as my invention:

1. A light-tight sample transfer mechanism comprising:
   a sample-receiving transfer well,
   fluid operated means for transferring a sample from the outside of said transfer well through an upper portion of said well and to a lower portion,
   first fluid-operated means near the top of said well for sealing said well in light-tight relationship,
   second fluid-operated means between the upper and lower portions of said well for sealing said sample transferring means in light-tight relationship,
   means responsive to the position of said transferring means for opening and closing said first and said second fluid operated sealing means,
   and means coupling said first fluid-operated sealing means and said second fluid-operated sealing means so that at least one of said sealing means is in light-tight sealing relationship.

2. The sample transfer mechanism of claim 1 wherein said transferring means comprises a central elevator shaft and an elevatable axial sleeve slidably mounted on said shaft, said axial sleeve being sealed by said second fluid-operated sealing means.

References Cited

UNITED STATES PATENTS 3,254,224   5/1966   Peterson ---------- 250—105 X
3,283,151   11/1966  Rowan et al. ----- 250—106 X ARCHIE R. BORCHELT, *Primary Examiner.*

U.S. Cl. X.R.

250—105